INVENTORS
PAUL WOLLNER
RICHARD H. WALTER, JR.
BY Clark & Ott
ATTORNEYS

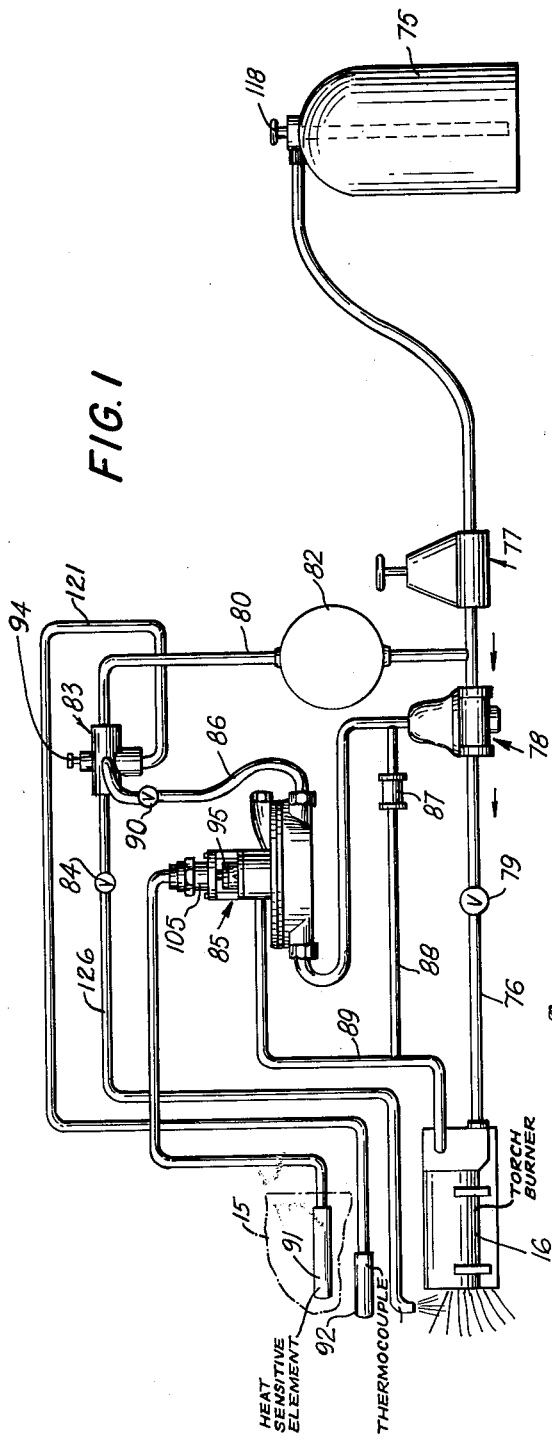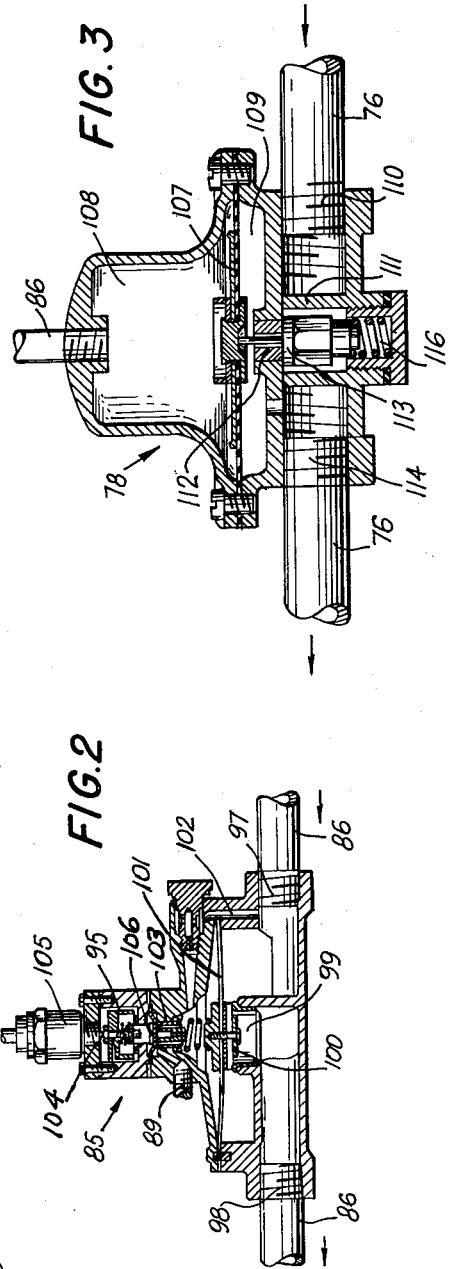
INVENTOR.
PAUL WOLLNER
RICHARD H. WALTER, JR.
BY
Clark + Ott
ATTORNEYS July 30, 1963 P. WOLLNER ET AL 3,099,392
TEMPERATURE CONTROL SYSTEMS
Filed June 27, 1960 2 Sheets-Sheet 2

United States Patent Office 3,099,392
Patented July 30, 1963

3,099,392
TEMPERATURE CONTROL SYSTEMS
Paul Wollner, North Bergen, and Richard H. Walter, Jr., Ramsay, N.J., assignors to Aeroil Products Company, Inc., South Hackensack, N.J., a corporation of Delaware
Filed June 27, 1960, Ser. No. 38,884
3 Claims. (Cl. 236—21)

This invention relates to temperature control systems using hydrocarbon fuel and the invention has particular reference to a system for supplying hydrocarbon fuel to the burner of heating equipment for melting bituminous material and the like.

An object of the invention is to provide a system for automatically controlling the flow of hydrocarbon fuel to a burner of a heating apparatus for melting bituminous material and the like in accordance with the temperature required for heating the material and which material must not be heated to the flash point thereof.

Still another object of the invention is to provide a temperature control system for regulating the flow of fuel through a flow control valve arranged in the fuel supply line and having the pressure of the fuel on one side of the diaphragm thereof and vaporized fuel at the pressure of the fuel in the fuel supply line on the other side thereof.

Still another object of the invention is to provide means for reducing the pressure of the vaporized fuel on the diaphragm of the flow control valve upon increase of temperature in the material being heated beyond a predetermined limit and to reduce the pressure of the fuel below that required for the flow thereof in the event the material being heated approaches the flash point thereof.

Still another object of the invention is to provide a system of said character in which liquid hydrocarbon fuel such as liquid propane gas may be employed.

Another object of the invention is to provide a fuel control system for portable heating apparatus for use where electric current is not available or can only be obtained by use of storage batteries.

Another object of the invention is to provide a fuel control system which is rugged and will withstand shocks of transportation, is easy to operate and install and requires a minimum of maintenance.

With the foregoing and other objects in view, reference is now made to the following specification and accompanying drawings in which the preferred embodiments of the invention are illustrated.

In the drawings:

FIG. 1 is a schematic view of a temperature control system embodying the invention.

FIG. 2 is an enlarged sectional view through the thermostatic control valve arranged in said system.

FIG. 3 is an enlarged sectional view through the flow control valve arranged in the system.

Figure 4:
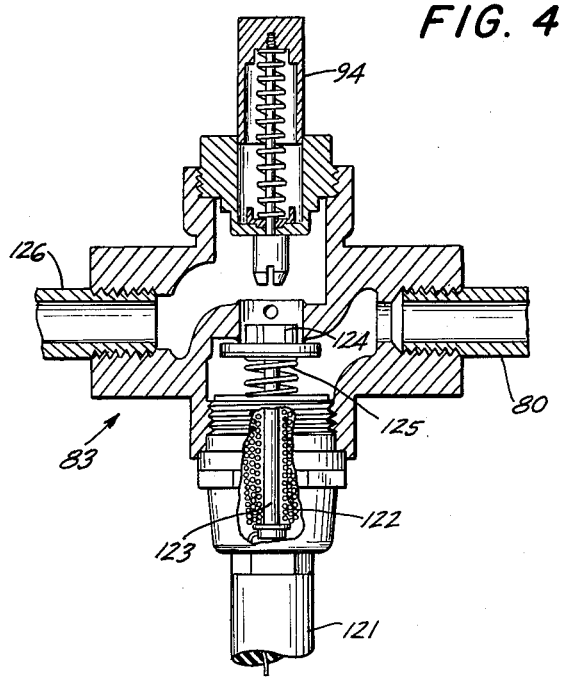
FIG. 4 is a vertical sectional view through the solenoid safety valve.

The temperature control system is illustrated in its application to a portable heating apparatus for heating bituminous material and the like for surfacing roads, roofing and the like and in such apparatus the material is heated by a torch burner connected with a fuel tank which is pressurized by any desired means.

Torch burners of this type are preheated and when this takes place the fuel line to the burner is opened and the supply of fuel is thereafter automatically controlled in accordance with the present invention.

The temperature control system may employ liquid propane gas as a hydrocarbon fuel as shown in the schematic view of the system illustrated in FIG. 1 of the drawings. In this system the fuel is contained under pressure in a supply cylinder 75 which is connected with the torch burner 16 by a fuel supply line 76. Interposed in this line is a pressure reducing valve 77, a flow control valve 78 and a manual control valve 79 for manually closing off the flow of the fuel to the burner. Between the valve 77 and the flow control valve 78, a pipe line 80 branches from the fuel supply line 76 and is connected with the pilot burner 81 of the torch burner 16 through a vaporizer 82, a safety valve 83 and a manual control valve 84 for manually closing off the flow of vapor to the pilot burner 81. A thermostatic control valve 85 is connected by a conduit 86 with the safety valve 83 and with the flow control valve 78. A bleed line 88 is connected with the conduit 86 adjacent the flow control valve 78 and this line has a reduced orifice 87 therein and is connected with a bleed line 89 extending from the thermostatic control valve 85 and which opens into the combustion chamber of the torch burner 16. A manually operated valve 90 is interposed in the conduit 86 between the thermostatic control valve 85 and the safety valve 83. Connected with the thermostatic control valve is a heat sensitive element 91 having an expansive medium adapted to control the actuation of said control valve. The element 91 is disposed at a sensitive location in the material being heated in the apparatus.

The safety valve 83 is of the solenoid type and has a thermocouple 92 which is located adjacent the pilot burner 81 for controlling the operation of said valve. This valve is normally closed and is manually opened by depressing the release button 94 thereof. When the thermocouple has been sufficiently heated by the flame of the pilot burner, the valve will remain open. The thermocouple is connected by an electrical cable 121 with a solenoid coil 122 through which coil extends the stem 123 of the valve element 124 which is normally disposed in closed relation by a coil spring 125. The safety valve remains open so long as the pilot burner 81 is lit to thereby heat the thermocouple 92 which functions to energize the coil 122. If the pilot light goes out, the coil is de-energized and the spring 125 moves the valve element to closed relation to thereby immediately shut off the flow of vapor through the valve to the conduit 86 and to conduit 126 connected with the pilot burner 81.

The pressure reducing valve 77 is set at the desired operating pressure for supplying the liquid propane gas to the torch burner 16. The fuel will be admitted to the vaporizer 82 at this pressure which will vaporize in the vaporizer at ambient temperature. The vapor will fill the upper portion of the vaporizer which will provide the normal supply thereof to the pilot burner 81 through the conduit 80 and the vapor required for controlling the operation of the flow control valve 78. The vaporizer has a relatively large surface area, relative to the line supplying liquid fuel thereto, surrounded by the ambient atmosphere and is adapted to contain a relatively large quantity of the liquid fuel whereby the liquid fuel is vaporized by the heat of the ambient atmosphere surrounding the vaporizer and occupies the space above the liquid fuel and is relatively dry.

The control valve 85 is set by adjusting the disc 95 thereof at the desired operating temperature for melting the material in the apparatus. When the temperature in the material being heated reaches the preset temperature, the valve will close and the pressure of the vapor on the flow control valve 78 will be shut off and the flow of fuel through the fuel supply line to the torch burner will be thereby shut off. The valve 85 as shown in section in FIG. 7 of the drawings includes an inlet 97, an outlet 98 and intermediate said inlet and outlet is a valve port 99 with a valve element 100 carried by the diaphragm 101 for controlling the flow of the vapor through said valve port. A by-pass duct 102 extends from said inlet and opens into the chamber above said diaphragm and in which is arranged a pilot valve 103 for controlling the flow of the vapor to the bleed line 89. The pilot valve is normally open and is controlled by the thermostat 105 having the sensitive element 91. The thermostat 105 has a reciprocatory actuating pin 104 arranged to engage the valve element 106 of the pilot valve 103 for moving the same toward closed relation with increase of temperature on the sensitive element 91. Thus, when the temperature in the material being heated in the apparatus approaches the predetermined degree set by the setting of the disc 95, the valve element 106 of the pilot valve will be moved toward closed relation to thereby reduce the flow of the vapor through the bleed line and increase the pressure in the chamber above the diaphragm and thereby move the diaphragm and the valve element 100 toward closed relation to reduce the flow of the vapor to the flow control valve 78. When the temperature in the material being heated reaches the predetermined temperature setting on the control valve 85, the valve element 106 thereof is moved to closed relation by the thermostat 105 to thereby instantaneously close the flow control valve 85 whereby the valve 78 controlling the flow of the fluid to the torch burner will be instantly closed so as to shut off the flow of the fuel to the torch burner.

The flow control valve 78 is of standard construction and includes a diaphragm 107 which divides the valve into upper and lower chambers 108 and 109. The lower chamber is in communication with the inlet 110 through passageways 111 and 112, the passageway 112 providing a seat for a valve element 113 which is adapted to close off the flow from the inlet. The lower chamber 109 is also in communication with the outlet 114 and the valve element 113 is biased by a coil spring 116 toward closed relation. The pressure of the fuel in the lower chamber and the pressure of said coil spring 116 is exerted against the diaphragm in opposition to the pressure of the vapor in the upper chamber 108 admitted thereto through the pipe line 86. Thus, when the flow of the vapor to the upper chamber is reduced as hereinbefore described, the pressure on the diaphragm 107 is reduced and the valve element 113 is moved toward closed relation to thereby reduce the flow of the fuel through the pipe line 76 to the burner of the apparatus.

It will be understood that the pressure of the vapor in the upper chamber of the flow control valve 78 is the same as the pressure of the liquid fuel on the inlet side 97 of said valve 78 when the thermostatic control valve 85 is open.

Figure 5:
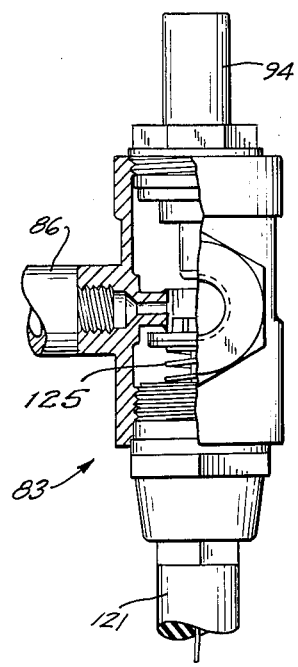
FIG. 5 is a side view of the solenoid safety valve with a portion of the casing broken away.

In FIGS. 1 to 5 inclusive, vapor is admitted to the upper chamber 108 of the flow control valve 78 for controlling the flow of the liquid fuel therethrough and while these have been referred to as air and vapor, the same are gases and are regarded as such in this application.

In starting operation of the system shown in the schematic view shown in FIG. 1 of the drawings, the hand operated valves 79, 84 and 90 are closed. The valve 18 of the fuel supply cylinder 75 is then opened. This will supply fuel to the vaporizer 82 after which the valve 84 is opened and the release button 94 of the safety valve 83 is depressed. The pilot burner is then ignited and the release button held in depressed position until the thermocouple 92 is sufficiently heated to maintain the safety valve 83 in open relation. The valve 90 is now opened and the vaporizer 82 will vaporize sufficient fuel for operating the pilot burner 81 and the flow control valve 78. The manual control valve 79 is then opened so as to admit liquid fuel to the torch burner 16 which will be ignited by the pilot burner.

While the preferred form of the invention is shown and described herein, it is to be understood that the invention is not so limited but shall cover and include any and all modifications thereof which fall within the purview of the invention.

What is claimed is:

1. A control system for controlling the flow of liquefied petroleum gas in liquid form to the burner of an apparatus for melting material, said system comprising a receptacle for containing liquid fuel under pressure, a fuel supply line connected with said receptacle, a liquid fuel flow control valve interposed in said supply line having a diaphragm and a valve port on one side of said diaphragm and a valve element in operative engagement with said diaphragm for controlling the flow of liquid fuel through said valve, means biasing said valve element to maintain said valve in normally closed relation, a pipe line connected with said flow control valve on the side of said diaphragm opposite said port and connected with the fuel supply line on the inlet side of the flow control valve, a vaporizer arranged in said pipe line providing a relatively large surface area in engagement with the ambient atmosphere and having a relatively large capacity for the liquid fuel whereby the liquid fuel is vaporized therein by heat obtained from the atmosphere surrounding the vaporizer which vapor occupies the space above the liquid fuel in the vaporizer for the flow of the vapor through said pipe line at the pressure of the liquid fuel on the inlet side of said flow control valve, a safety valve arranged in said pipe line having a valve port and a valve element for controlling the flow of vapor through said valve, means biasing the valve element of said safety valve to maintain said valve in normally closed relation, a pilot burner connected by piping with the outlet side of said safety valve for the flow of vapor to said pilot burner for igniting the burner of the apparatus when said safety valve is open, thermocouple means arranged in position to receive heat from said pilot burner and connected with said valve element of said safety control valve for maintaining the valve thereof in open relation when said thermocouple means is heated by a flame from said pilot burner and whereby the valve element is moved to closed relation by the biasing means thereof to shut off the flow of vapor through said valve in the event the flame from the pilot burner is extinguished, a vapor flow control valve arranged in said pipe line between said safety valve and said liquid flow control valve and having a valve element and means biasing said valve element to maintain said valve in normally closed relation, and said vapor flow control valve having heat sensitive thermostatic means subject to the heat of material being heated in said apparatus and functioning to move the valve element thereof to close said valve and thereby eliminate the pressure of the vapor on the diaphragm of said liquid fuel flow control valve in the event that the temperature of said heat sensitive means reaches a predetermined temperature whereby the valve element of said liquid fuel flow control valve is moved by the biasing means thereof to closed relation to thereby shut off the flow of liquid fuel in said liquid fuel supply line.

2. A control system for controlling the flow of liquefied petroleum gas in liquid form to the burner of an apparatus for melting material, said system comprising a receptacle for containing liquid fuel under pressure, a fuel supply line connected with said receptacle, a liquid flow control valve interposed in said supply line having a diaphragm and a valve element for controlling the flow of liquid fuel through said valve and means biasing said valve element to maintain said valve in normally closed relation, a pipe line connected with said flow control valve and with the fuel supply line on the inlet side of the flow control valve, a vaporizer arranged in said pipe line providing a relatively large surface area in engagement with the ambient atmosphere and having a relatively large capacity for the liquid fuel whereby the liquid fuel is vaporized therein by heat obtained from the atmosphere surrounding the vaporizer which vapor occupies the space above the liquid fuel in the vaporizer for the flow of the vapor through said pipe line at the pressure of the liquid fuel on the inlet side of said flow control valve a safety valve arranged in said pipe line and having a valve element and means biasing said valve element to maintain said valve in normally closed relation, a pilot burner connected by piping with the outlet side of said safety valve for the flow of vapor to said pilot burner for igniting the burner of the apparatus when said safety valve is open, the thermosensitive means arranged in position to receive heat from said pilot burner and connected with said valve element of said safety control valve for maintaining the valve in open relation when said pilot thermosensitive means is heated by a flame from said pilot burner and whereby the valve element is moved to closed relation by the biasing means thereof to shut off the flow of vapor through said valve in the event the flame from the pilot burner is extinguished, a vapor flow control valve having a valve element and means biasing the valve element to maintain the valve in normally closed relation, said vapor flow control valve being arranged in said pipe line between said safety valve and said liquid flow control valve for controlling the flow of vapor against the diaphragm of said liquid flow control valve, and said vapor flow control valve having heat sensitive thermostatic means subject to the heat of material being heated in said apparatus and functioning to move the valve element thereof to close said valve and thereby eliminate the pressure of the vapor on the diaphragm of said liquid flow control valve in the event that the temperature of said heat sensitive means reaches a predetermined temperature whereby the valve element of said liquid flow control valve is moved by the biasing means thereof to closed relation to thereby shut off the flow of liquid fuel in said fuel supply line.

3. A control system for controlling the flow of liquefied petroleum gas in liquid form to the burner of an apparatus for melting material, said system comprising a receptacle for containing liquid fuel under pressure, a fuel supply line connected with said receptacle, a liquid flow control valve interposed in said supply line and having a diaphragm and valve element for controlling the flow of liquid fuel therethrough, means biasing said valve element to closed relation, an auxiliary pipe line connected with said flow control valve and with the fuel line on the inlet side of said flow control valve, a vaporizer arranged in said auxiliary pipe line providing a relatively large surface area in engagement with the ambient atmosphere and having a relatively large capacity for the liquid fuel whereby the liquid fuel is vaporized therein by heat obtained from the atmosphere surrounding the vaporizer and which vapor occupies the space above the liquid fuel in the vaporizer for the flow thereof through said auxiliary pipe line, a safety valve arranged in said auxiliary pipe line for controlling the flow of vapor therethrough, a pilot burner connected with said safety valve for receiving vapor therefrom, thermosensitive means arranged in position to receive heat from the pilot burner when ignited and connected with said safety valve for maintaining said valve in open relation when the thermosensitive means is heated, a vapor flow control valve arranged in said auxiliary pipe line and between said safety valve and said liquid flow control valve for admitting the flow of vapor against the diaphragm of said liquid flow control valve to thereby maintain said liquid flow control valve in open relation, heat sensitive means subject to the material being heated and connected with said vapor flow control valve to shut off the flow of vapor against the diaphragm of said liquid flow control valve in the event that the temperature of said heat sensitive means reaches a predetermined temperature whereby said liquid flow control valve is closed by the biasing means thereof to thereby shut off the flow of liquid in said fuel supply line.

References Cited in the file of this patent
UNITED STATES PATENTS

| | | |
|---|---|---|
| 1,327,675 | Hornung | Jan. 13, 1920 |
| 1,715,650 | Fonseca | June 4, 1929 |
| 2,001,068 | MacGregor et al. | May 14, 1935 |
| 2,057,494 | Leigh | Oct. 13, 1936 |
| 2,372,564 | Engholdt | Mar. 27, 1945 |
| 2,445,502 | Vaughn et al. | July 20, 1948 |
| 2,497,549 | Heller | Feb. 14, 1950 |
| 2,504,964 | Cunningham | Apr. 25, 1960 |